(12) United States Patent
Bruggeman

(10) Patent No.: US 12,117,324 B2
(45) Date of Patent: Oct. 15, 2024

(54) ULTRASONIC FLOW METER

(71) Applicant: Berkin B.V., Ruurlo (NL)

(72) Inventor: Coen Adrian Robert Tom Bruggeman, Ruurlo (NL)

(73) Assignee: Berkin B.V., Ruurlo (NL)

( * ) Notice: Subject to any disclaimer, the term of this patent is extended or adjusted under 35 U.S.C. 154(b) by 382 days.

(21) Appl. No.: 17/636,303

(22) PCT Filed: Aug. 12, 2020

(86) PCT No.: PCT/NL2020/050507
§ 371 (c)(1),
(2) Date: Feb. 17, 2022

(87) PCT Pub. No.: WO2021/034189
PCT Pub. Date: Feb. 25, 2021

(65) Prior Publication Data
US 2022/0205822 A1   Jun. 30, 2022

(30) Foreign Application Priority Data

Aug. 21, 2019  (NL) ...................................... 2023675

(51) Int. Cl.
| | |
|---|---|
| G01F 1/66 | (2022.01) |
| G01F 1/667 | (2022.01) |
| G01N 29/02 | (2006.01) |
| G01N 29/036 | (2006.01) |
| G01N 29/22 | (2006.01) |

(Continued)

(52) U.S. Cl.
CPC .............. *G01F 1/662* (2013.01); *G01F 1/667* (2013.01); *G01N 29/02* (2013.01); *G01N 29/036* (2013.01); *G01N 29/221* (2013.01); *G01N 29/222* (2013.01); *G10K 11/002* (2013.01); *G10K 11/161* (2013.01)

(58) Field of Classification Search
CPC ......... G01F 1/662; G01F 1/667; G01N 29/02; G01N 29/036; G01N 29/221; G01N 29/222; G10K 11/002; G10K 11/161
See application file for complete search history.

(56) References Cited

U.S. PATENT DOCUMENTS

| | | |
|---|---|---|
| 2012/0222492 A1 | 9/2012 | Quin et al. |
| 2014/0311253 A1 | 10/2014 | Iwasa |
| 2017/0307425 A1* | 10/2017 | Berberig ................. G01F 1/662 |

FOREIGN PATENT DOCUMENTS

WO    2017061870 A1    4/2017

* cited by examiner

*Primary Examiner* — Benjamin R Schmitt
(74) *Attorney, Agent, or Firm* — Casimir Jones SC; Tyler Sisk; Thomas Lyneis

(57) ABSTRACT

An ultrasonic flow measurement system (1) comprising a flow tube (11), an ultrasound damping layer (12), an ultrasound transmitter (13) covered by the ultrasound damping layer, and an ultrasound receiver (14) covered by the ultrasound damping layer, characterised in that the ultrasound damping layer comprises: —a first damping portion (121) that is at least partially positioned in between the ultrasound transmitter and the ultrasound receiver as well as—a second damping portion (122) that is at least partially positioned in between the ultrasound transmitter and the ultrasound receiver, wherein the first damping portion and the second damping portion of the ultrasound damping layer are spaced apart from each other by a distance (d) in an axial direction (A) of the flow tube.

14 Claims, 5 Drawing Sheets

(51) Int. Cl.
*G10K 11/00* (2006.01)
*G10K 11/16* (2006.01)

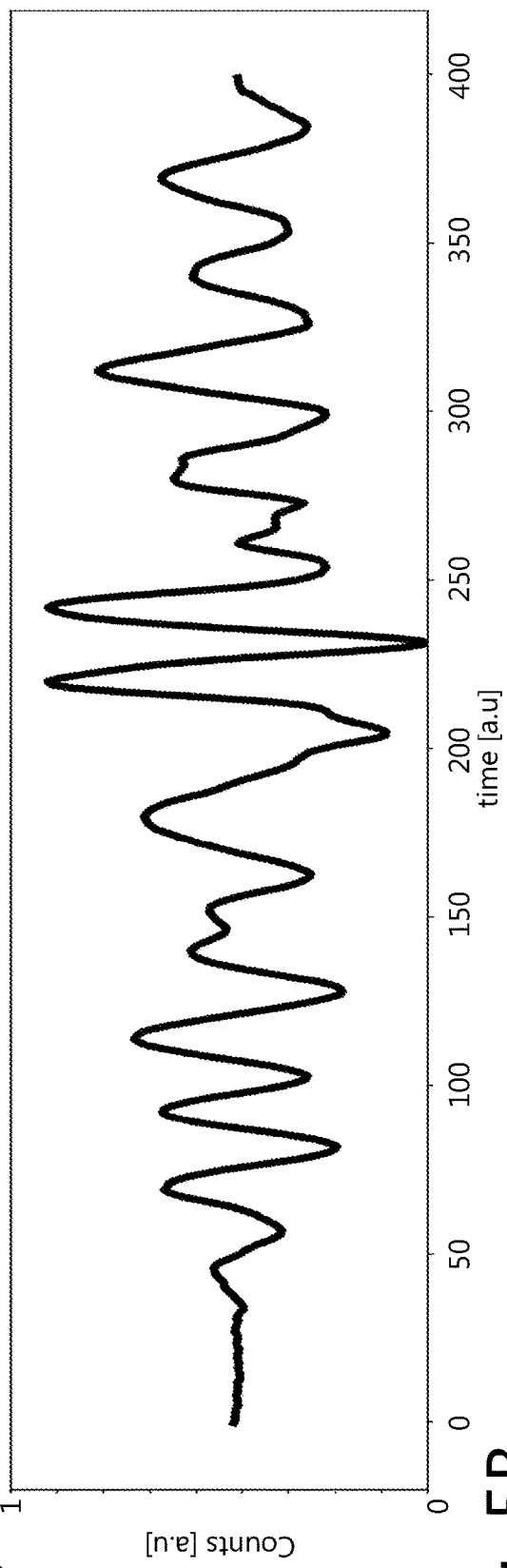
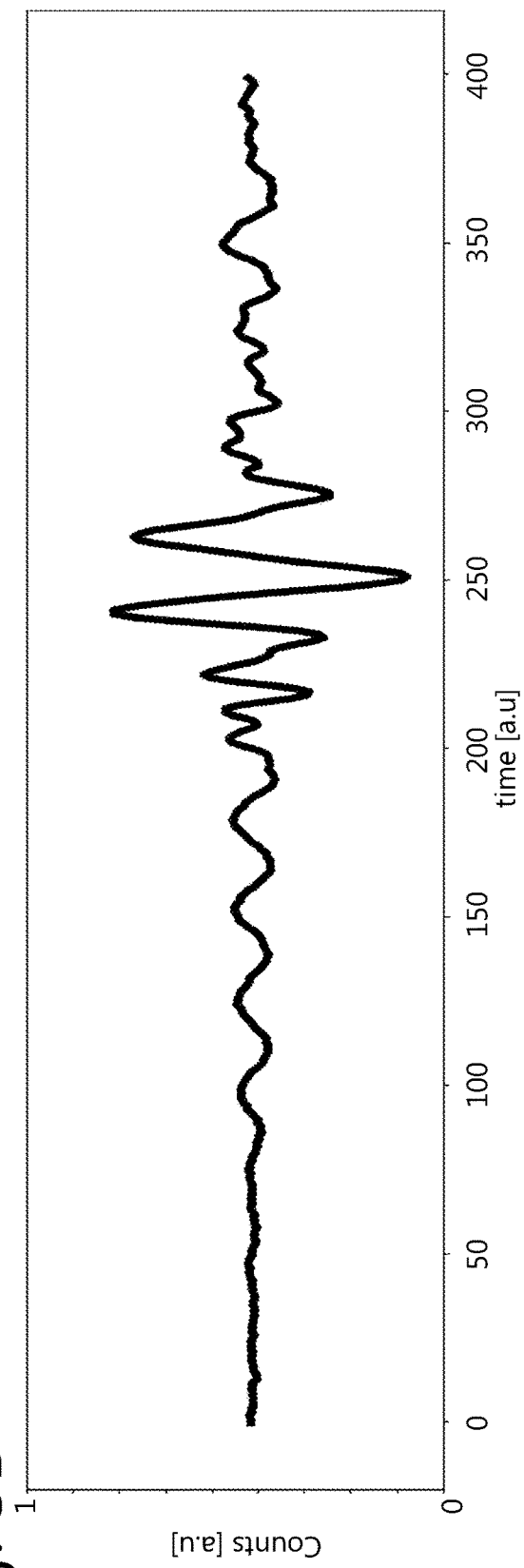

ULTRASONIC FLOW METER

The present invention relates to an ultrasonic flow measurement system, comprising:
- a flow tube for fluid whose flow rate is to be determined;
- an ultrasound damping layer (or dampening layer), provided at an outer side of the flow tube and substantially surrounding said flow tube, the speed of sound in the material of the flow tube being higher than the speed of sound in the material of the ultrasound damping layer;
- an ultrasound transmitter, arranged on the outer side of the flow tube and covered by the ultrasound damping layer, the ultrasound transmitter being configured to transmit ultrasound signals through said fluid in a transmitting phase, and
- an ultrasound receiver, arranged on the outer side of the flow tube and covered by the ultrasound damping layer, the ultrasound receiver being configured to receive transmitted ultrasound signals in a receiving phase.

WO 2017/061870 A1, in the name of the same applicant, discloses an ultrasonic flow measurement system comprising a flow tube, at least two ultrasound transducer circuits, at least one receiving circuit, control means, and an ultrasound damping layer. The flow tube is for the fluid whose flow rate is to be determined. The at least two ultrasound transducer circuits are provided on the outer side of the flow tube, wherein at least one of the at least two ultrasound transducer circuits comprises an ultrasound transmitter that is arranged for transmitting ultrasound signals through said fluid in a transmitting phase, and wherein at least another one of the at least two ultrasound transducer circuits comprises an ultrasound receiver that is arranged for receiving transmitted ultrasound signals in a receiving phase. The receiving circuit is arranged for reading out the ultrasound receiver in the receiving phase. The control means is connected to the at least two ultrasound transducer circuits and to the at least one receiving circuit. The flow measurement system comprises an ultrasound damping layer provided on the outer jacket of the flow tube, wherein the ultrasound damping layer is provided such that it substantially surrounds the outer jacket of the flow tube and is in contact with both the ultrasound transmitter and the ultrasound receiver. The speed of sound in the material of the flow tube substantially exceeds the speed of sound in the material of the ultrasound damping layer.

As explained in WO 2017/061870 A1 use of the transmitter, which is in contact with the flow tube, results in ultrasonic waves propagating parallel to the longitudinal axis of the flow tube. On the interface of a solid (i.e. the flow tube) and a fluid (i.e. the fluid to be measured, either a liquid or a gas) a Scholte wave appears. On the interface of a solid (the flow tube) and a solid (the ultrasound damping layer) Stoneley waves appear. Due to the different speeds of sound in the materials of the flow tube and the ultrasound damping layer, at least a portion of the waves that do not interact with the fluid arrive at the receiver at a later point in time than the waves that do interact with the fluid, improving the signal/noise ratio, and thus the measurement accuracy.

However, depending on the circumstances under which the measurement takes place, the measurement achieved with the ultrasonic flow measurement system of WO 2017/061870 A1 may still be sub-optimal. Accordingly, a need for an improved ultrasonic flow measurement system exists.

Therefore, it is an object of the present invention to provide an improved ultrasonic flow measurement system. More in particular, it is an object of the invention to provide an ultrasonic flow measurement system with a higher signal/noise ratio and/or an ultrasonic flow measurement system that is smaller in size.

In order to achieve that object, according to the invention an ultrasonic flow measurement system is provided wherein the ultrasound damping layer comprises a first damping portion that is at least partially positioned in between the ultrasound transmitter and the ultrasound receiver as well as a second damping portion that is at least partially positioned in between the ultrasound transmitter and the ultrasound receiver. The first damping portion and the second damping portion of the ultrasound damping layer are spaced apart from each other by a distance in an axial direction of the flow tube.

Hence, when seen in an axial direction of the flow tube, i.e. in a direction from the transmitter to the receiver (or vice versa), the ultrasound damping layer is interrupted. In other words, the first damping portion and the second damping portion are not in contact with each other. In yet other words, a section, gap or 'void' is present in between the first damping portion and the second damping portion.

The separation of the first damping portion with respect to the second damping portion, i.e. the presence of a section, gap or void, in axial direction of the flow tube prevents "bulk acoustic waves", such as the above-mentioned Stoneley waves, or at least a significant part thereof, from reaching the receiver after they are transmitted by the transmitter. Accordingly, the signal/noise ratio as received by the receiver is improved and the object of the invention is achieved.

Furthermore, as will be explained in more detail in the below, compared to the prior art, the thickness and/or volume of the ultrasound damping layer may be reduced while achieving a similar signal/noise ratio as in the prior art. Therefore, the present ultrasonic flow measurement system may be miniaturized, which is of course beneficial if minute flows through small-diameter (e.g. 0.001 mm to 30 mm, or preferably 0.1 mm-10 mm) flow tubes are to be measured. However, a less thick ultrasound damping layer is also beneficial for flow pipes having a larger diameter.

US 2012/222492 A1 discloses a system with an ultrasonic flow meter. The ultrasonic flow meter includes a first ultrasonic transducer disposed about a fluid flow path, and a pressure balancing system configured to pressure balance the first ultrasonic transducer relative to a fluid flow along the fluid flow path. It should be noted that the present invention uses ultrasonic surface waves. An important function of the damping layer according to the present invention is to create a solid-solid surface where Stoneley waves are formed, and to dampen and delay the Stoneley waves. On the interface of a solid and a fluid (i.e. the fluid to be measured, either a liquid or a gas) a Scholte wave appears. On the interface of a solid (the flow tube) and a solid (the ultrasound damping layer) Stoneley waves appear. Due to the different speeds of sound in the materials of the flow tube and the ultrasound damping layer, at least a portion of the Stoneley waves (which are often only partially dampened) that do not interact with the fluid arrive at the receiver at a later point in time than the Scholte waves that do interact with the fluid, improving the signal/noise ratio, and thus the measurement accuracy. US 2012/222492 A1 ensures that the transducers communicate only through the fluid in the conduit and does not describe the use of surface waves.

US 2014/311253 A1 discloses an ultrasonic sensor comprising a ring-shaped ultrasonic vibrator that is disposed on an outer circumferential surface of a conduit tube in which a minute flow quantity substance flows and that is vibrated by application of high frequency signals and generates high frequency signals by receiving the vibration and a pair of damping members that are arranged so as to grasp and fix the ultrasonic vibrator, wherein an annular soft uniform matching member having a width along said conduit tube larger than that of said ultrasonic vibrator is provided between an inner circumferential surface of said ultrasonic vibrator and said outer circumferential surface of said conduit tube, and said matching member is made of a material having a sound propagation velocity substantially equal to a sound propagation velocity of the substance flowing in the conduit tube. US 2014/311253 A1 requires that the "vibrator" and the "damping members" are separated from the tube by an "annular soft uniform matching member", whereas the present invention requires direct contact between both the transducer and the tube, as well as the damping layer and the tube. The "annular soft uniform matching member" of US 2014/311253 A1 permits no direct contact between the transducer and the tube and thus interferes with the generation of ultrasonic surface waves. An "annular soft uniform matching member" is not suitable for a device where surface waves are used, since it would prevent direct contact between the transducer and the tube.

Preferably the first and second damping portion do not contact each other anywhere, to obtain the highest signal/noise ratio when performing a measurement.

The fluid whose flow rate is to be determined may be a liquid or a gas or a mixture, including suspensions, dispersions, solutions, emulsions and aerosols.

Both the ultrasound transmitter and the ultrasound receiver are 'covered' by the ultrasound damping layer. That is, at least the crystals which receive and transmit signals are covered or surrounded by the ultrasound damping layer. Of course, wires or other components associated with the ultrasound receiver and ultrasound transmitter may extend from the ultrasound damping layer. The ultrasound damping layer may be made out of one material, or it may be composed of several materials, for example a filler, optionally in several layers. Such layers could essentially be concentric.

In an embodiment, the distance is defined between a first end face of the first damping portion and a second end face of the second damping portion, which both face the section or void or gap and each other, the distance being smaller than 10 mm, e.g. about 9 mm or smaller, such as about 8 mm or smaller, 7 mm or smaller, or 6 mm or smaller, although for larger devices the distance may also be larger, such as about 30 mm or smaller, 20 mm or smaller or 15 mm or smaller. Preferably, said distance is smaller than 5 mm, such as between 0.1 mm and 5 mm, e.g. about 0.1 mm or about 0.5 mm, or about 1 mm. As the first damping portion and the second portion are spaced apart from each other and do not contact each other, the distance between the end faces of the respective damping portions that face each other is larger than 0 mm. For practical reasons, it is conceivable that the distance is at least 0.5 mm, e.g. between 0.5 mm and 5 mm or between 0.5 mm and 10 mm.

A large distance between any one of the transmitters and the receiver influences the signal/noise ratio negatively. It has further been found by the applicant that a distance between the first damping portion and the second damping portion which is too large influences the signal/noise ratio in a negative way. Accordingly, preferably the distance between the section-facing first end face of the first damping portion and the section-facing second end face of the second damping portion is less than 90% of the distance between the receiver and the transmitter, such as smaller than 50%. Preferably, the distance between said first end face of the first damping portion and said second end face of the second damping portion is less than 10% of the distance between the receiver and the transmitter, more preferably less than 5%, such as 1% or even less.

In an embodiment, a section-facing first end face of the first damping portion has an essentially flat surface and/or a section-facing second end face of the second damping portion has an essentially flat surface. Preferably, each of the end faces has a flat surface as this is easy to produce.

In an alternative embodiment however, the section-facing first end face of the first damping portion has a curved shape, e.g. a convex shape, a concave shape or a sinusoidal shape and/or the section-facing second end face of the second damping portion has a curved shape, e.g. a convex shape, a concave shape or a sinusoidal shape. Preferably, the shapes of the end faces are approximately mirror-symmetrical. For example, if one of the end faces is convex, the other is preferably concave, such that the distance between the end faces is approximately constant at every cross-section of the ultrasound damping layer. In yet another embodiment, both the first end and the second end have a similar (curved) shape, e.g. both have a convex shape, a concave shape or a sinusoidal shape.

In an embodiment wherein the end faces are flat, an angle between the axial direction of the flow tube and the section-facing first end face of the first damping portion is between 135° and 45°, in particular between 100° and 80° and/or an angle between the axial direction of the flow tube and the section-facing second end face of the second damping portion is between 135° and 45°, in particular between 100° and 80°. Preferably, the angle between the section-facing second end face of the second damping portion and the axial direction of the flow tube is approximately equal to the angle between said first end face of the first damping portion and the axial direction of the flow tube, such that a distance between these two damping portions is the same in all cross-sectional planes. Preferably, the angle between the axial direction of the flow tube and the first face of the first damping portion and the second face of the second damping portion is about 90°. If the above-mentioned angles are different, preferably the first and second damping portion do not contact each other anywhere, to obtain the highest signal/noise ratio when performing a measurement.

In an embodiment, a section, gap or "void" having at least semi-impenetrable acoustic properties is arranged in between the first damping portion and the second damping portion of the ultrasound damping layer. In the context of the present application, the words "at least semi-impenetrable acoustic properties" mean that the respective section has a relatively high resistance against acoustic penetration, such that acoustic signals cannot easily be transferred from the first damping portion to the second damping portion, and only a small portion (e.g. less than half of it and optimally nothing at all) of an acoustic signal present in the first damping portion is transferred to the second damping portion, and vice versa. This helps to improve the signal/noise ratio of the measurement system. It is specifically noted that the wording "at least semi-impenetrable" includes the wording "impenetrable".

Examples of sections having at least semi-impenetrable acoustic properties are a relative vacuum (i.e. a section with an underpressure relative to the environment), a section of air, and a section of foam material having a closed cell structure. When the acoustically impenetrable section consists of a (relative) vacuum and/or comprises air, one may say that a 'void' or a 'gap' is present in between the first and second damping portion. When a section of foam material (having a closed cell structure), or another material, is present in between the first and second damping portion, one may said that the 'void' or 'gap' is filled with a foam material.

In an embodiment, the thickness of the ultrasound damping layer is less than 6 times the radius of the flow tube. In the prior art system, this ratio was usually at least 10 or 20 to reach a signal/noise ratio with which proper measurements could be made. With the system as disclosed in the present disclosure, this ratio may be as low as 6 or less, such that a much thinner measurement system can result. The ultrasound receiver and ultrasound transmitter are preferably always covered by the ultrasound damping layer. Depending on the type of transmitter/receiver used and the radius of the flow tube, the ratio between the thickness of the ultrasound damping layer and the radius of the flow tube may be higher or lower. Generally speaking: the thinner the flow tube, the higher said ratio will be.

In an embodiment, a distance between the ultrasound receiver and a section-facing first end face of the first damping portion and a distance between the ultrasound receiver and a section-facing second end face of the second damping portion is larger than 0.1 mm, and/or wherein a distance between the ultrasound transmitter and a section-facing first end face of the first damping portion and a distance between the ultrasound transmitter and a section-facing second end face of the second damping portion is larger than 0.1 mm. That is, the distance between the 'void' (empty or filled) and each of the ultrasound receiver and ultrasound transmitter is preferably larger than 0.1 mm, e.g. larger than 0.5 mm, larger than 1 mm, larger than 5 mm and/or larger than 10 mm.

In an embodiment, the ultrasound damping layer comprises a third damping portion, arranged in between the first damping portion and the second damping portion, and spaced apart from said first damping portion and said second damping portion in an axial direction of the flow tube. When a third damping portion is present in between the ultrasound transmitter and the ultrasound receiver (seen in an axial direction of the flow tube) one may say that there are two 'voids' (filled or empty) in between the ultrasound transmitter and the ultrasound receiver. If (in the situation where there are two damping portions) a part of the signal is transmitted from the first damping portion to the second damping portion, providing a third damping portion in between the first damping portion and the second damping portion may introduce a second 'barrier' for the signal, such that a smaller part of the signal is transmitted from the first damping portion, via the third damping portion, to the second damping portion (or vice versa), compared to the situation where there are only two damping portions. Optionally there are even more damping portions arranged in between the first damping portion and the second damping portion, such as a fourth damping portion, a fifth damping portion etc.

In an embodiment, the ultrasonic flow measurement system further comprises at least a second ultrasound transmitter and/or at least a second ultrasound receiver, wherein the ultrasound damping layer comprises at least one further damping portion spaced apart from both the first damping portion and the second damping portion in an axial direction of the flow tube, wherein said further damping portion is at least partially positioned in between one of the ultrasound receiver or the ultrasound transmitter and the at least a second ultrasound transmitter or the at least a second ultrasound receiver. This will be explained in more detail in the below, with reference to the figures.

In an embodiment, the ultrasound damping layer is made of an epoxy material that is preferably dark-coloured, e.g. black. The ultrasound damping layer can also be made of a potting material, such as epoxy or polyurethane.

In an embodiment, the ultrasound flow measurement system further comprises an outer sleeve, arranged at the outer side of the ultrasound damping layer. For example, the sleeve may help to retain a relative vacuum in the space between the first damping portion and the second damping portion, if the acoustically impenetrable section consists of a relative vacuum. Furthermore, the sleeve may ensure that the space in between the first damping portion and the second damping portion remains free of pollution, which may gradually reduce the improved measurement accuracy. The outer sleeve is preferably thin, e.g. having a thickness that is smaller than the thickness of the ultrasound damping layer. Preferably, the outer sleeve has a low acoustic conductivity.

In an embodiment, the ultrasonic flow measurement system further comprises a receiving circuit that is arranged for reading out the ultrasound receiver in the receiving phase of the system.

In an embodiment, the ultrasonic flow measurement system further comprises control means connected to the receiving circuit, the ultrasound transmitter, and the ultrasound receiver.

In an embodiment, the ultrasound transmitter and/or the ultrasound receiver is embodied as an ultrasound transducer, the transducer being operable as either a transmitter and a receiver. This allows e.g. the measurement of flows in two directions, depending on how the transducer is operated.

In an embodiment, the ultrasound transmitter and/or ultrasound receiver is formed as a ring-shaped oscillator, preferably covering the entire circumference of the flow tube. This allows the measurement of flow in the entire internal volume of the flow tube.

In an embodiment the damping layer fully surrounds the flow tube in circumferential direction. In particular also the ultrasound transducers (transmitter and receiver) are surrounded by the damping layer.

In a preferred embodiment, the damping layer is approximately circular, or has another geometric shape such as approximately triangular, square, or hexagonal. The surface does not need to be smooth; Applicant has found that small aberrations on the surface will not affect performance negatively, and surface roughness may improve performance.

The ultrasound transducer is preferably in acoustic contact with the outer jacket of the flow tube, for example in that it is directly connected thereto, or is provided thereon via an acoustically conductive (preferably thin) layer.

The damping layer preferably extends in the full circumferential direction of the flow tube. In this case, the flow tube and the ultrasound transducers are surrounded, as it were, by a second, larger tube that is made up of the material of the ultrasound damping layer. An inner side of this second, larger tube formed by the damping layer is in full contact with the part of the outer jacket of the flow tube extending between the outer most ultrasound transducers. In a preferred embodiment, the damping layer has essentially equal thickness in the circumferential direction at the location of the transducers. In another embodiment, the damping layer has essentially equal thickness in the axial direction from the first end face to the second end face of any portion.

The speed of sound in the material of the flow tube is in an embodiment larger than 2000 m/s, in particular larger than 2500 m/s, more specifically in between 3000 m/s and 7000 m/s.

The speed of sound in the material of the ultrasound damping layer is in an embodiment larger than 1000 m/s, in particular larger than 1500 m/s, more specifically in between 2000 m/s and 3000 m/s.

In an embodiment, the flow measurement system is designed for measuring flows of fluids having a speed of sound that lies within the range of 1000 m/s and 2000 m/s. In that case, the speed of sound in the material of the ultrasound damping layer lies in between 2000 m/s and 3000 m/s, and the speed of sound in the material of the flow tube is larger than 3000 m/s. Preferably, the flow measurement system is designed such that the speed of sound of each of the damping layer, the flow tube and the flow to be measured, substantially differs from each other, for example by approximately 500 m/s or even 1000 m/s. For example, in case the system is designed for a fluid having a speed of sound of approximately 1800 m/s, the speed of sound of the damping layer may be approximately 2300 m/s, and the speed of sound of the material of the flow tube may be approximately 3300 m/s.

In an embodiment, the difference between the speed of sound in the flow tube and the speed of sound in the damping layer may be in the same order, or even be substantially the same as the difference between the speed of sound in the damping layer and the speed of sound in the flow to be measured. For example, in case the speed of sound in the flow tube is approximately 4500 m/s, the speed of sound in the damping layer may be designed to be approximately 3000 m/s, and then the flow measurement system is suitable to be used for media having a speed of sound in the range of 1000 m/s to 2000 m/s, more in particular a speed of sound of approximately 1500 m/s.

In an embodiment, each of the ultrasound transmitter and the ultrasound receiver is an ultrasound transducer that is arranged for transmitting ultrasound signals through said fluid in a respective transmitting phase thereof, and for receiving transmitted signals from another ultrasound transducer in a respective receiving phase thereof. With this it is possible to alternately energize the transducers to emit ultrasonic waves, which waves are detected by the other, non-energized oscillator. The time the ultrasonic waves require to propagate upstream and the time the new ultrasonic waves require for propagating downstream, as well as the time difference therebetween, is used for determining the flow velocity and/or mass flow in the flow tube. To this end, it is advantageous when the flow measurement system comprises multiplexer circuit arranged for selectively connecting said at least one receiving circuit to one of said at least two ultrasound transducers. In an embodiment, said at least two transducers are arranged to alternately transmit said ultrasound signals, and said multiplexer circuitry is arranged to alternately connect each of said at least one receiving circuits to one of said non-transmitting ultrasound transducers, respectively. Time delays, time errors and/or time offsets occurring in the at least one receiving circuit adversely affect the accuracy of the flow rate measurements. These time delays, time errors and/or time offsets may be compensated, i.e. filtered out, in case the flow measurement system comprises a multiplexer circuit arranged for selectively connecting the at least one receiving circuit to one of said non-transmitting transducers.

In an embodiment, the damping layer comprises epoxy or a composite thereof. The damping layer can also be made of a potting compound, preferably comprising or consisting of epoxy, polyurethane or a composite. The ultrasound damping layer may be made of a cured epoxy resin, in particular chosen from the group consisting of Bisphenol A epoxy resin, Bisphenol F epoxy resin, Novolac epoxy resin, Aliphatic epoxy resin, and Glycidylamine epoxy resin. The epoxy resin may be cured by means of homopolymerisation, or by means of an epoxy hardener chosen from the group consisting of amines, anhydrides, phenols, and thiols. In an embodiment, the damping layer may be a potting material, preferably epoxy or a composite thereof, or polyurethane or a polyurethane composite and the flow tube may comprise a material other than (stainless) steel, Teflon, PEEK, glass, or ceramic. In another embodiment, the epoxy may be coloured, preferably black. In yet another embodiment, the damping layer may comprise a potting material, preferably epoxy or a composite thereof, or polyurethane or a polyurethane composite, and/or may comprise several layers. These layers could, for example, be defined in a radial or an axial direction. The layers may be concentric. It is also possible to have a layer directly in contact with a receiver or a transmitter and a different layer elsewhere. In an alternative embodiment, the damping layer may be made of any material but epoxy or a composite thereof. As mentioned before, the damping layer may be made of a potting material, preferably epoxy, or a composite thereof, or polyurethane or a polyurethane composite.

A suitable material for the flow tube may be a metal, such as a (stainless) steel tube. Other materials for the flow tube are also conceivable, such as hastelloy, or a non-metal, such as teflon, PEEK, glass or a ceramic material. In an embodiment, the flow tube is a metal, such as a (stainless) steel tube, hastelloy, or a non-metal, such as teflon, PEEK, glass or a ceramic material, and the damping material is a material free from epoxy or a composite thereof.

In an embodiment, the damping layer is designed such that, in use, the speed of sound in the material of the damping layer substantially exceeds the speed of sound in the fluid whose flow rate is to be determined.

In a relatively simple embodiment, which is also relatively easy to produce, the ultrasound transducer (that is, the ultrasound receiver and/or the ultrasound transmitter) comprises a piezo element. Said piezo element may comprise a relatively thin piezo film. A polyvinylidene fluoride or polyvinylidene difluoride (PVDF) material may alternatively be used. PVDF has a very strong piezoelectric effect, and PVDF is in particular suitable for generating a voltage when the material is set vibrating. Furthermore, it is conceivable to use a PZT element, a ceramic crystal that can function as a transmitter and/or receiver.

In an embodiment of the invention, the assembly of the flow tube, the ultrasound transmitter and the ultrasound receiver, are completely moulded in the epoxy or the epoxy composite as described above, or another potting material, including polyurethane or a polyurethane composite, while ensuring that there is a distance between the first damping portion and the second damping portion and means for attaching the tube to the outer world remains uncovered. This way an improved ultrasonic flow meter can be provided in a relatively easy and cost-effective way. The above described assembly may be inserted into a hollow tube-mould, after which the uncured epoxy or epoxy composite or another potting material, including polyurethane or a polyurethane composite, may be poured in between the assembly and the inner jacket of the tube-mould. After curing, the tube-mould may be removed.

In one embodiment, the ultrasound transducers (ultrasound transmitter and receiver) are provided at least substantially entirely around the flow tube. In this way a substantially rotation-symmetrical signal is obtained, and essentially an average of the flow will be determined if the flow should not be entirely uniform.

In an embodiment, the flow tube is a straight tube in order to effect a substantially uniform flow in the flow tube.

The invention will now be explained in more detail by means of a description of a few possible embodiments as shown in the appended figures. In the figures:

FIGS. 5a and 5b show measurements obtained with a prior art ultrasonic flow measurement system and an embodiment of the ultrasonic flow measurement system according to the present invention.

Figure 1:
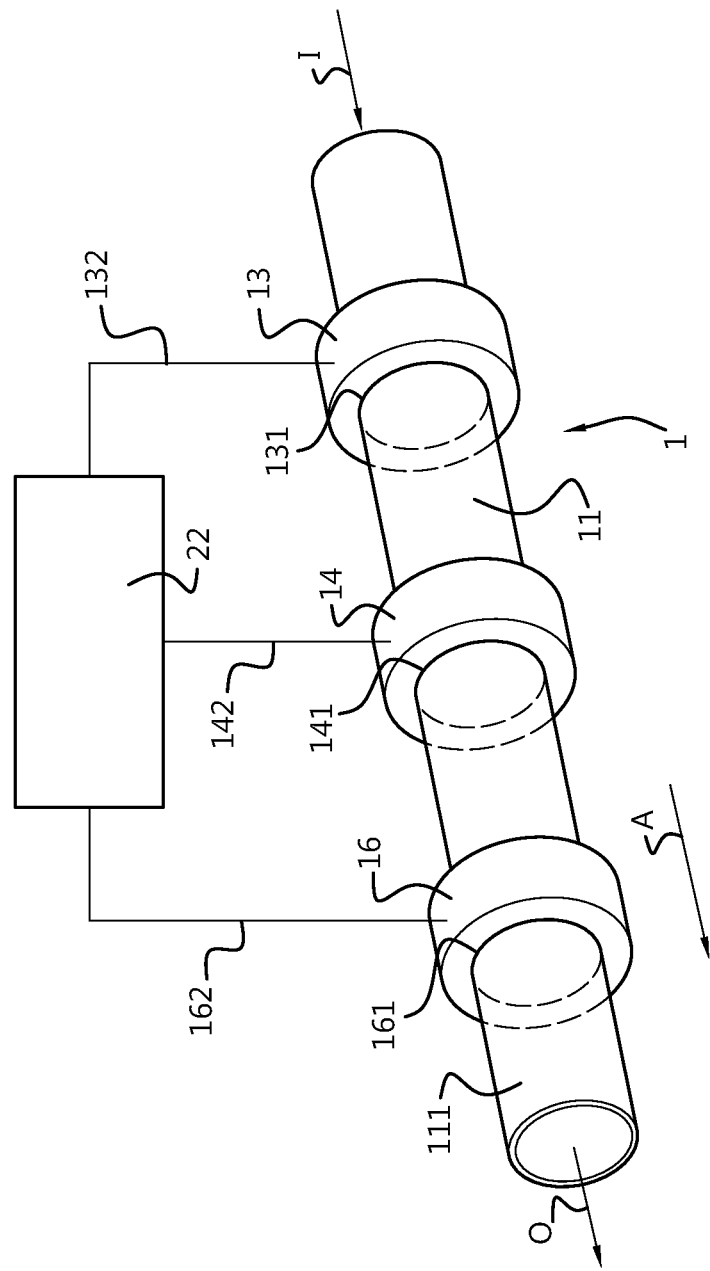
FIG. 1 is a schematic isometric view of an ultrasonic flow measurement system according to the invention, wherein the ultrasound damping layer is omitted to clearly show the other components of the system.

FIG. 1 shows an embodiment of an ultrasonic flow measurement system 1, wherein the ultrasound damping layer is omitted to show the other components of the system 1 more clearly. As shown in FIG. 1, the ultrasonic flow measurement system 1 comprises a flow tube 11, an first ultrasound transducer 13, here in the form of a first ultrasound transmitter, and a second ultrasound transducer 14, here in the form of a first ultrasound receiver. The ultrasonic flow measurement system 1 may further comprise a third ultrasound transducer 16, here e.g. in the form of a second ultrasound receiver, acoustically conductive layers 131, 141, 161 each associated with one of the ultrasound transducers 13, 14, 16, wiring 132, 142, 162 associated with each of the ultrasound transducers 13, 14, 16, and a controller 22.

The flow tube 11 of the ultrasonic flow measurement system 1 is for fluid whose flow rate is to be determined. The fluid may be either a gas or a liquid or a mixture, including suspensions, dispersions, solutions, emulsions and aerosols and flows through the flow tube 11. The ultrasonic flow measurement system 1 may be most suited to measure the flow rate of a gas. The flow tube 11 has an inlet I, an outlet O and an outer side 111. The "normal" direction of flow of fluid in the flow tube 11 will be from the inlet I to the outlet O. The flow tube 11 is preferably straight, at least in the part thereof where the ultrasonic flow measurement system 1 is provided. A radius of the flow tube 11 may e.g. be between 0.1 mm and 10 mm, such as between 1 mm and 10 mm or such as between 0.5 mm and 1 mm. An axial direction of the flow tube 11 is indicated with reference A.

The ultrasonic flow measurement system 1 comprises at least one ultrasound transmitter 13 and at least one ultrasound receiver 14. Preferably, both the transmitter 13 and the receiver 14 are embodied as a more generic ultrasound transducer, the at least two transducers being spaced apart from each other. An ultrasound transducer is a device which may, at least, be operated as either a transmitter or as a receiver (or both at the same time). Accordingly, when it is described herein that the ultrasonic flow measure system 1 comprises at least one receiver 14 and at least one transmitter 13, this means that in use of the system, when the system comprises at least two transducers, at least one of the transducers is operated in a transmitting mode (i.e. as a transmitter), and at least one of the transducers is operated in the receiving mode (i.e. as a receiver).

The ultrasound transmitter 13 is arranged on the outer side 111 of the flow tube 11 and is configured to transmit ultrasound signals through said fluid in a transmitting phase (transmitting mode). Associated with the ultrasound transmitter 13 is an acoustically conductive layer 131, arranged between a crystal of the transmitter 13 and the outer side 111 of the flow tube 11, to optimally transmit the acoustic signals transmitted by the transmitter to the inner volume of flow tube 11, to reach the fluid therein, such that the acoustic signal can ultimately be carried by the fluid. Further associated with the ultrasound transmitter is wiring 132, connecting the transmitter 13 and the controller 22, such that signals (e.g. steering signals) may be send from the controller 22 to the transmitter 13 and/or vice versa. Although the present figures show physical wiring, it is noted that signals between the transmitter 13 and the controller 22 may of course alternatively be send via wire-less communication means (and the same holds for signals between the controller 22 and any other receiver/transmitter/transducer).

The ultrasound receiver 14 is arranged on the outer side 111 of the flow tube 11 and is configured to receive ultrasound signals which have been transmitted by the ultrasound transmitter 13 (and carried by the fluid) in a receiving phase (receiving mode). Associated with the ultrasound receiver 14 is an acoustically conductive layer 141, arranged between a crystal of the receiver and the outer side 111 of the flow tube 11, to optimally receive acoustic signals present inside the inner volume of flow tube 11. Further associated with the ultrasound receiver 14 is wiring 142, connecting the receiver 14 and the controller 22, such that signals (e.g. steering signals or signals corresponding to received measurements) may be send from the controller 22 to the receiver 14 and/or vice versa.

The third ultrasound transducer 16, here e.g. configured to operate as a second ultrasound receiver, is arranged on the outer side 111 of the flow tube 11 and is configured to receive ultrasound signals which have been transmitted by the ultrasound transmitter 13 (and carried by the fluid) in a receiving phase (receiving mode). Associated with the ultrasound receiver 16 is an acoustically conductive layer 161, arranged between a crystal of the receiver 16 and the outer side 111 of the flow tube 11, to optimally receive acoustic signals present inside the inner volume of flow tube 11. Further associated with the ultrasound receiver 16 is wiring 162, connecting the receiver 16 and the controller 22, such that signals (e.g. steering signals or signals corresponding to received measurements) may be send from the controller 22 to the receiver 16 and/or vice versa. Advantageously, by providing two ultrasound receivers 14, 16 more accurate measurements of fluid flow may be performed, as now two signals may be measured and the error may be minimized. That is, any measurement inherently has an error margin. By making two measurements and averaging said error margin, a more accurate measurement may be obtained.

It is noted that the third transducer 16 may alternatively be operated as an ultrasound transmitter, e.g. to allow also the measurement of flows when the direction of flow is reversed, e.g. when fluid is flowing in a direction from outlet O to inlet I. The receiver 14 may then e.g. receive signals transmitted by transmitter 16.

Further alternatively, even more transducers may be provided. For example, more than one transmitter, such as two, three, four or even more transmitters, may be provided and/or more than one receiver such as two, three, four or even more receivers may be provided.

Yet alternatively, the second transducer 14 as well as the first transducer 13 may be operated as an ultrasound transmitter, while the third transducer is operated as an ultrasound receiver. The receiver then receives the signals transmitted by both the first transmitter and the second transmitter. In other words, the ultrasonic flow measurement system 1 may comprise two transmitters and at least one, such as on, two or three, receivers.

Controller 22 is arranged in communication with each of the transducers 13, 14, 16 and is configured to control, e.g. steer and/or manipulate operation of the ultrasonic flow measurement system.

Figure 2:
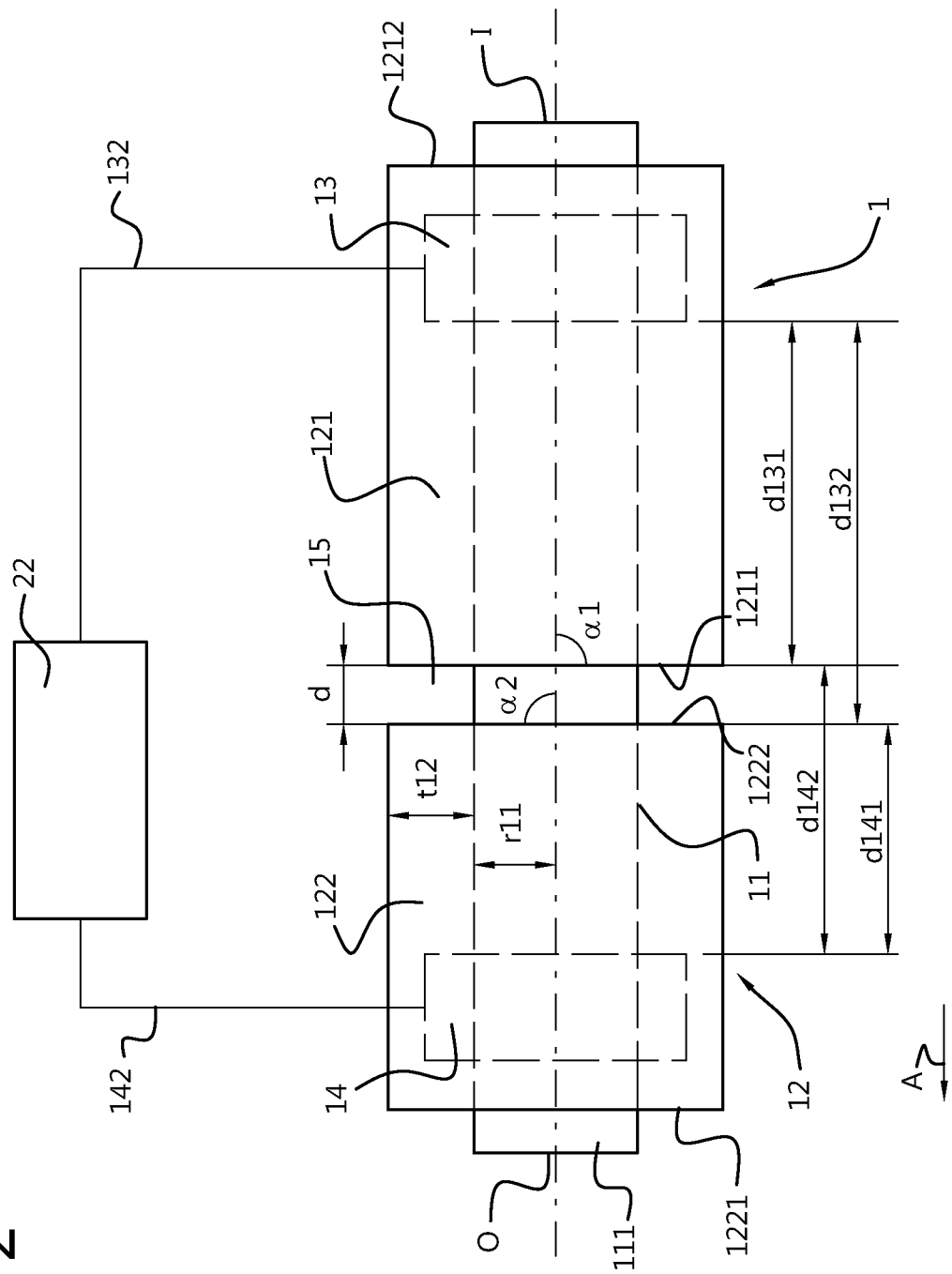
FIG. 2 is a schematic cross sectional view of a first embodiment of the ultrasonic flow measurement system according to the invention.

Turning now to FIG. 2, similar components are denoted with the same reference numerals and will not be described in detail again.

In contrast to FIG. 1, FIG. 2 shows an ultrasound damping layer 12, e.g. made of an epoxy material that is preferably dark-coloured, e.g. black. The ultrasound damping layer 12 is provided at the outer side 111 of the flow tube 11 and substantially surrounds said flow tube 11. A thickness t12 of the ultrasound damping layer 12 is preferably less than 6 times the radius r11 of the flow tube 11. In that respect, it is noted that the figures are not necessarily to scale. That is, in embodiments of the invention the radius r11 of the flow tube 11, compared to the thickness t12 of the ultrasound damping layer 12 may be much smaller (or larger) than here depicted. The speed of sound in the material of the flow tube 11 is higher than the speed of sound in the material of the ultrasound damping layer 12. The ultrasound damping layer 12 covers both the ultrasound transmitter 13 and the ultrasound receiver 14.

The ultrasound damping layer 12 comprises at least a first damping portion 121 and a second damping portion 122, which are spaced apart from each other by a distance d in the axial direction A of the flow tube 11. That is, the first damping portion 121 comprises a first end face 1211, facing the section, gap or void (i.e. section-facing), and a second end face 1212, and the second damping portion 122 also comprises a first end face 1221 and a second end face 1222, facing the section, gap or void, wherein the section-facing first end face 1211 of the first damping portion 1211 faces the section-facing second end face 1222 of the second damping portion 122 and is spaced apart therefrom, such that a section 15 having at least semi-impenetrable acoustic properties is defined therebetween.

For example, said section 15 may consist of a relative vacuum, comprise air, and/or comprise a foam material having a closed cell structure.

Each of the first damping portion 121 and the second damping portion 122 is positioned to surround the ultrasound transmitter 13 and the ultrasound receiver 14 respectively, such that the section 15 having acoustically semi-impenetrable properties is positioned in between the transmitter 13 and the receiver 14, when seen in the axial direction A of the flow tube 11.

All end faces 1211, 1212, 1221, 1222 of all damping portions 121, 122 here have a flat surface. An first angle α1 is defined between the section-facing first end face 1211 of the first damping portion and the longitudinal axis A of the flow tube 11. A second angle α2 is defined between the section-facing second end face 1222 of the second damping portion and the longitudinal axis A of the flow tube 11. Preferably, said angles α1, α2 are the same and about 90°.

For example, said angles α1, α2 are each between 135° and 45°, in particular between 100° and 80°, such as 90°.

The distance d between the first damping portion 121 and the second damping portion 122 is defined between the section-facing first end face 1211 of the first damping portion 121 and the section-facing second end face 1222 of the second damping portion 122 (that faces the first end face 1211 of the first damping portion 121). Preferably, said distance is smaller than 10 mm, e.g. smaller than 5 mm, such as between 0.5 mm and 5 mm.

The distance between the ultrasound transmitter 13 and the section 15 having at least semi-impenetrable acoustical properties is preferably larger than 0.1 mm, e.g. larger than 5 mm. That is, the distance d131 between the ultrasound transmitter 13 and the section-facing first end face 1211 of the first damping portion 121 is preferably larger than 0.1 mm, while also a distance d132 between the ultrasound transmitter 13 and a section-facing second end face 1222 of the second damping portion 122 is larger than 0.1 mm.

The distance between the ultrasound receiver 14 and the section 15 having at least semi-impenetrable acoustical properties is preferably larger than 0.1 mm. That is, the distance d142 between the ultrasound receiver 14 and the section-facing first end face 1211 of the first damping portion 121 is preferably larger than 0.1 mm, while also a distance d141 between the ultrasound receiver 14 and a section-facing second end face 1222 of the second damping portion 122 is larger than 0.1 mm.

Figure 3:
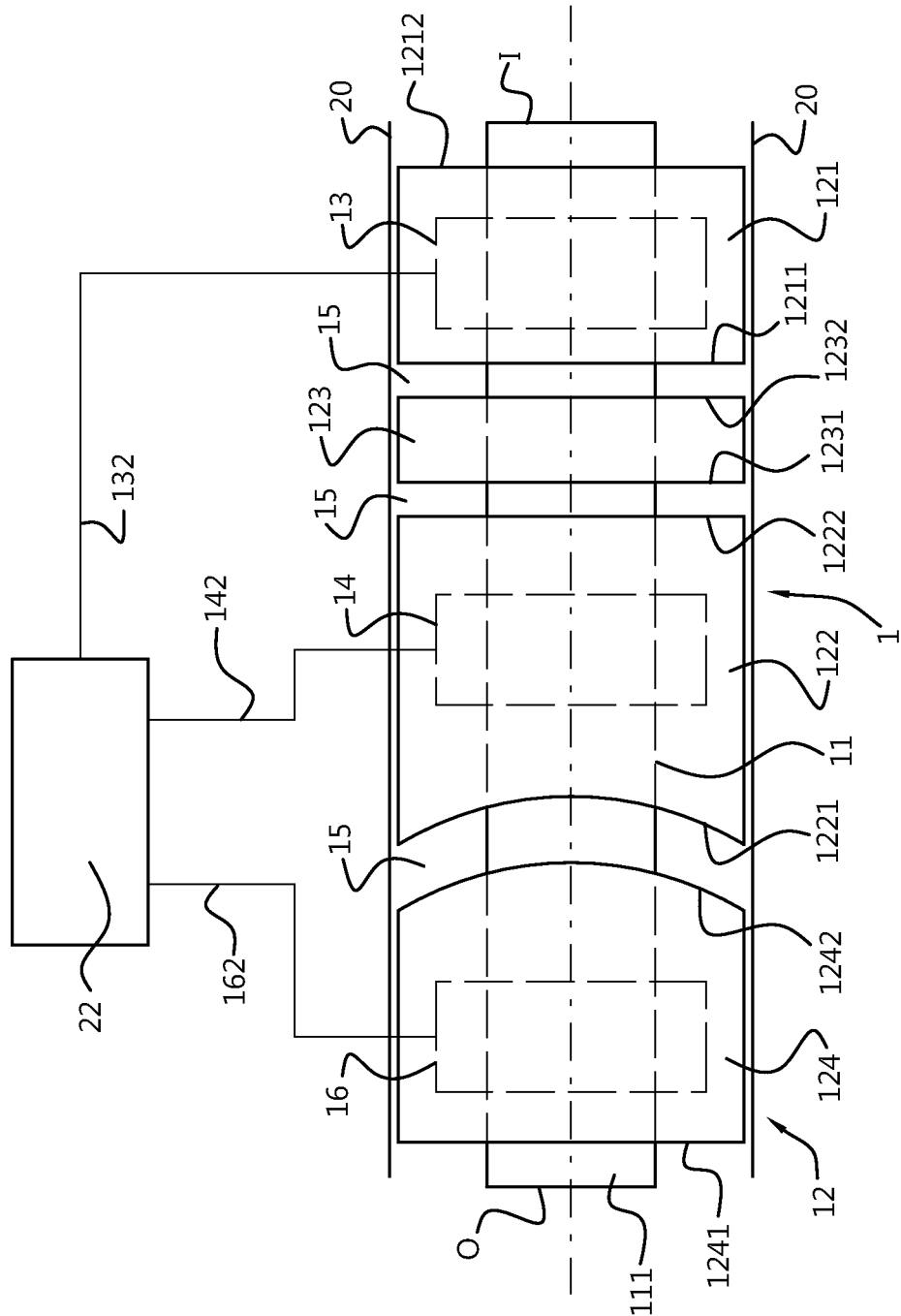
FIG. 3 is a schematic cross sectional view of a second embodiment of the ultrasonic flow measurement system according to the invention.

Turning now to FIG. 3, similar components are again denoted with the same reference numerals and will not all be described in detail again. Angles and distances are not indicated in FIG. 3, to make the figure better understandable. However, angles and distances may of course be defined between the different components of the ultrasonic flow measurement system 1 in the same way as described with reference to FIG. 2.

A difference between FIG. 3 and FIG. 2 is that a third damping portion 123 of the ultrasound damping layer 12 is arranged between the first ultrasound transmitter 13 and the first ultrasound receiver 14 in FIG. 3. Seen in an axial direction A of the flow tube 11, the third damping portion 123 is spaced apart from both the first damping portion 121 and the second damping portion 122. In other words, first end face 1231 of third damping portion 123 does not contact section-facing second end face 1222 of second damping portion 122 and second end face 1232 of third damping portion 123 does not contact section-facing first end face 1211 of first damping portion 121. Hence, two sections 15 having at least semi-impenetrable acoustic properties are here arranged in between the ultrasound receiver 14 and the ultrasound transmitter 13.

A further difference between FIG. 3 and FIG. 2 is that a third ultrasound transducer 16 is provided in FIG. 3. A third ultrasound transducer 16 was also shown in (and has been described with reference to) FIG. 1.

As there is a further ultrasound transducer 16, here third ultrasound transducer 16, which may e.g. be either a receiver or a transmitter, there is also a further damping portion, here fourth damping portion 124. The fourth damping portion 124 is spaced apart from the first damping portion 121 and the second damping portion 122 (and here also from the third damping portion 123) in an axial direction A of the flow tube 11 to define a section 15 having at least semi-impermeable acoustical properties between the second damping portion 122 and the fourth damping portion 124. The fourth damping portion 124 is at least partially positioned in between the third transducer 16 and the ultrasound receiver 14, such that the section 15 is also positioned between the third transducer 16 and the ultrasound receiver 14 (when seen in the axial direction A of the flow tube 11).

Further shown in FIG. 3 is that the section-facing second end face 1242 of one of the damping portions, here the fourth damping portion 124, may be curved, here convex. Also a first end face 1221 of one of the damping portions, here the second damping portion 122, may be curved, here concave. The shapes of the pair of section-facing end faces 1242, 1221 is matched to each other, such that the distance d between the end faces 1242, 1221 is constant across any cross-sectional plane of the ultrasound damping layer 12. Although the curved shapes are here shown as either concave or convex, of course also other curved shapes are conceivable.

Further visible in FIG. 3 is an outer sleeve 20 of the ultrasonic flow measurement system 1, arranged at the outer side of the ultrasound damping layer 12. An outer sleeve 20 may e.g. be provided to allow a relative vacuum to exist in sections 15.

Figure 4:
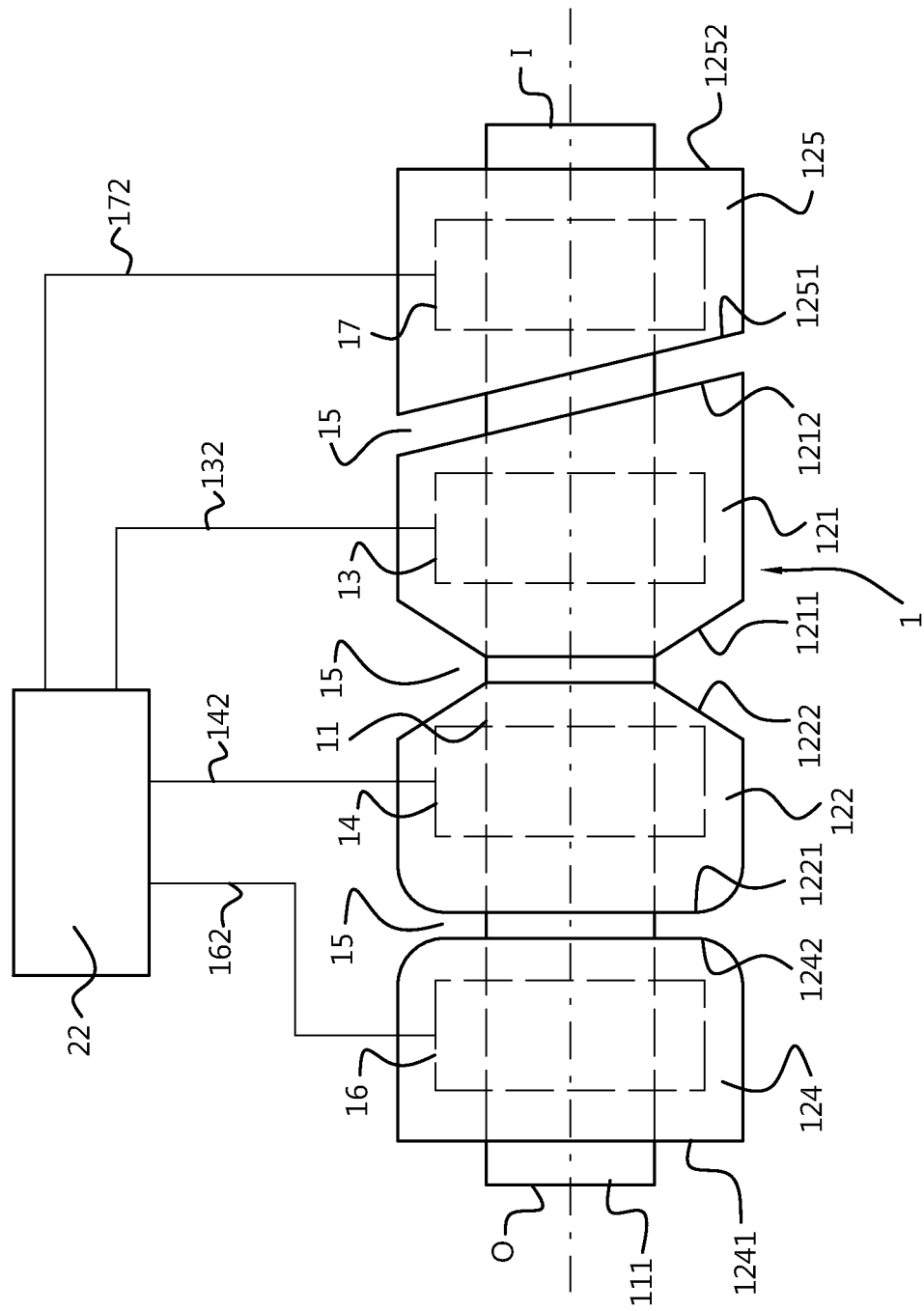
FIG. 4 is a schematic cross sectional view of a third embodiment of the ultrasonic flow measurement system according to the invention.

Turning now to FIG. 4, similar components are again denoted with the same reference numerals and will not all be described in detail again.

Shown in FIG. 4 are four ultrasound transducers 13, 14, 16, 17, but it is well conceivable that an ultrasonic flow measurement system 1 according to the invention comprises more than four ultrasound transducers. The four ultrasound transducers may e.g. comprise a first ultrasound transmitter 13, a second ultrasound transmitter 17, a first ultrasound receiver 14 and a second ultrasound receiver 16. In the embodiment of FIG. 4 there are then, seen in an axial direction A of the flow tube 11 two transmitters followed by two receivers.

However, the multiple receivers and transmitters may also be provided in a 'mixed' order, e.g. seen in a direction from inlet I to outlet O a transmitter, a receiver, a transmitter, and a receiver.

There may alternatively e.g. also be three receivers and one transmitter, or three transmitters and one receiver. Or three receivers and two transmitters, and so on.

Between two neighbouring ultrasound transducers 13, 14, 16, 17 at least one section 15 having semi-impenetrable acoustic properties is preferably provided. Each section 15 is defined by respective end faces of damping portions 121, 122, 124, 125 of the ultrasound damping layer 12.

However, when two neighbouring ultrasound transducers are of the same type, e.g. both a transmitter or both a receiver, a section 15 having semi-impenetrable acoustic properties therebetween is not required per se. When the two neighbouring ultrasound transducers are on the other hand of different types, e.g. one transmitter and one receiver, a section 15 having semi-impenetrable acoustic properties therebetween is strongly recommended.

In the embodiment of FIG. 4, the first angle $\alpha 1$ between the end face of the fifth damping portion 125 and the axial direction A of the flow tube 11 is smaller than 90°, while the second angle $\alpha 2$ between the end face of the first damping portion 121 and the axial direction A of the flow tube 11 is larger than 90°. However, as shown, although the angles are different in value, the distance d between the end faces constant, as is preferred.

However, a constant distances between two end faces that face each other is not required per se. This is e.g. illustrated at end faces 1222 and 1211, which both face the gap, void or section, where the end faces are tapered and wherein the distance between them is larger on the outer side of the ultrasound damping layer 12 than on the inner side thereof. However, also at the inner side the end faces 1222, 1211 are spaced apart.

Whereas section-facing end faces 1222, 1211 may tapered and have a flat surface, they may also be tapered and have a curved shape, as e.g. illustrated between the section-facing end faces 1221, 1242 of the first damping portion 121 and the third damping portion 124.

Turning now to FIGS. 5a and 5b, a comparative test between the prior art measurement system of WO 2017/061870 A1 (FIG. 5a) and an embodiment of the measurement system according to the present invention (FIG. 5b) is shown. The embodiment of the measurement system according to the present invention was made by creating a void of 1 mm between the ultrasound transmitter and ultrasound receiver in a device as described in the prior art, which had previously been used to record the data depicted in FIG. 5a. The ultrasound transmitter was set up to transmit ultrasound and the ultrasound receiver was set up to receive the signal of the transmitter using a standard electronic setup. Counts were recorded against time in arbitrary units. It is clearly visible that the setup records a significantly better signal/noise ratio for the ultrasonic flow measurement system that has a section, gap or void (FIG. 5b) than the system that has no section, gap or void (FIG. 5a).

The skilled person will appreciate that the invention has been explained in the foregoing with reference to preferred embodiments of the invention. However, the invention is not limited to these embodiments.

Accordingly, various modifications to the invention are conceivable within the framework of the invention, without departing from the spirit of the invention. The scope of protection sought is defined in the appended claims.

LIST OF REFERENCE NUMERALS

1—ultrasonic flow measurement system
11—flow tube
111—outer side of flow tube
12—ultrasound damping layer
121—first damping portion
1211—section-facing first end face of said first portion
1212—second end face of said first portion
122—second damping portion
1221—first end face of said second portion
1222—section-facing second end face of said second portion
123—third damping portion
1231—first end face of said third portion
1232—second end face of said third portion
124—further damping portion
1241—first end face of said further portion
1242—section-facing second end face of said further portion
125—further damping portion
1251—section-facing first end face of said further portion
1252—second end face of said further portion
13—first ultrasound transmitter
131—acoustically conductive layer
132—wiring
14—first ultrasound receiver
141—acoustically conductive layer
142—wiring
15—section having at least semi-impermeable acoustic properties
16—second ultrasound receiver
161—acoustically conductive layer 162—wiring
17—second ultrasound transmitter
172—wiring
20—outer sleeve
22—controller
A—axial direction of flow tube
O—outlet opening of flow tube
I—inlet opening of flow tube
d—distance between first end face of first damping portion and second end face second damping portion
d131—distance between first end face of first damping portion and first transmitter
d132—distance between second end face of second damping portion and first transmitter
d141—distance between second end face of second damping portion and first receiver
d142—distance between first end face of first damping portion and first receiver
r11—radius of flow tube
t12—thickness of ultrasound damping layer
α1—angle between first end face of first damping portion and axial direction of flow tube
α2—angle between second end face of second damping portion and axial direction of flow tube

The invention claimed is:

1. An ultrasonic flow measurement system, comprising:
a flow tube for fluid whose flow rate is to be determined;
an ultrasound damping layer, provided at an outer side of the flow tube and substantially surrounding said flow tube, the speed of sound in the material of the flow tube being higher than the speed of sound in the material of the ultrasound damping layer;
an ultrasound transmitter, arranged on the outer side of the flow tube and covered by the ultrasound damping layer, the ultrasound transmitter being configured to transmit ultrasound signals through said fluid in a transmitting phase, wherein Stoneley waves appear on the interface of the flow tube and the ultrasound damping layer and
an ultrasound receiver, arranged on the outer side of the flow tube and covered by the ultrasound damping layer, the ultrasound receiver being configured to receive transmitted ultrasound signals in a receiving phase, wherein the ultrasound damping layer comprises:
a first damping portion that is at least partially positioned in between the ultrasound transmitter and the ultrasound receiver as well as
a second damping portion that is at least partially positioned in between the ultrasound transmitter and the ultrasound receiver,
wherein the first damping portion and the second damping portion of the ultrasound damping layer are spaced apart from each other by a section, gap or void over a distance in an axial direction of the flow tube, wherein the section, gap or void at least partially prevents the Stoneley waves from reaching the ultrasound receiver after they are transmitted by the ultrasound transmitter,
wherein the flow tube is continuous,
wherein at least one section having at least semi-impenetrable acoustic properties is arranged in between the first damping portion and the second damping portion and spaced apart from said first damping portion and said second damping portion in an axial direction of the flow tube.

2. The ultrasonic flow measurement system according to claim 1, wherein at least one of a section-facing first end face of the first damping portion and a section-facing second end face of the second damping portion has a flat surface.

3. The ultrasonic flow measurement system according to claim 2, wherein both flat surfaces have the same shape.

4. The ultrasonic flow measurement system according to claim 1, wherein at least one of an angle between the axial direction of the flow tube and the section-facing first end face of the first damping portion and an angle between the axial direction of the flow tube and the section-facing second end face of the second damping portion is between 135° and 45°.

5. The ultrasonic flow measurement system according to claim 1, wherein at least one of a section-facing first end face of the first damping portion and a section-facing second end face of the second damping portion has a curved shape.

6. The ultrasonic flow measurement system according to claim 1, wherein said section consists of a relative vacuum.

7. The ultrasonic flow measurement system according to claim 1, wherein said section comprises air.

8. The ultrasonic flow measurement system according to claim 1, wherein said section comprises a foam material having a closed cell structure.

9. The ultrasonic flow measurement system according to claim 1, wherein the thickness of the ultrasound damping layer is less than 6 times the radius of the flow tube.

10. The ultrasonic flow measurement system according to claim 1, wherein at least one of a distance between the ultrasound receiver and a section-facing first end face of the first damping portion and a distance between the ultrasound receiver and a section-facing second end face of the second damping portion and a distance between the ultrasound transmitter and said first end face of the first damping portion and a distance between the ultrasound transmitter and said second end face of the second damping portion is larger than 0.1 mm.

11. The ultrasonic flow measurement system according to claim 1, wherein the ultrasound damping layer comprises a third damping portion, arranged in between the first damping portion and the second damping portion, and spaced apart from said first damping portion and said second damping portion in an axial direction of the flow tube.

12. The ultrasonic flow measurement system according to claim 1, comprising at least one of a second ultrasound transmitter and a second ultrasound receiver, wherein the ultrasound damping layer comprises at least one further damping portion spaced apart from both the first damping portion and the second damping portion in an axial direction of the flow tube, wherein said further damping portion is at least partially positioned in between one of the ultrasound receiver or the ultrasound transmitter and the at least one of a second ultrasound transmitter and the second ultrasound receiver.

13. The ultrasonic flow measurement system according to claim 1, further comprising an outer sleeve, arranged at the outer side of the ultrasound damping layer.

14. The ultrasonic flow measurement system according to claim 1, wherein the ultrasound damping layer comprises or consists of a potting compound or potting material.

* * * * *